Jan. 13, 1959 J. M. RICHARDS 2,868,068
APPARATUS FOR TESTING EYES
Filed April 28, 1953 3 Sheets-Sheet 1
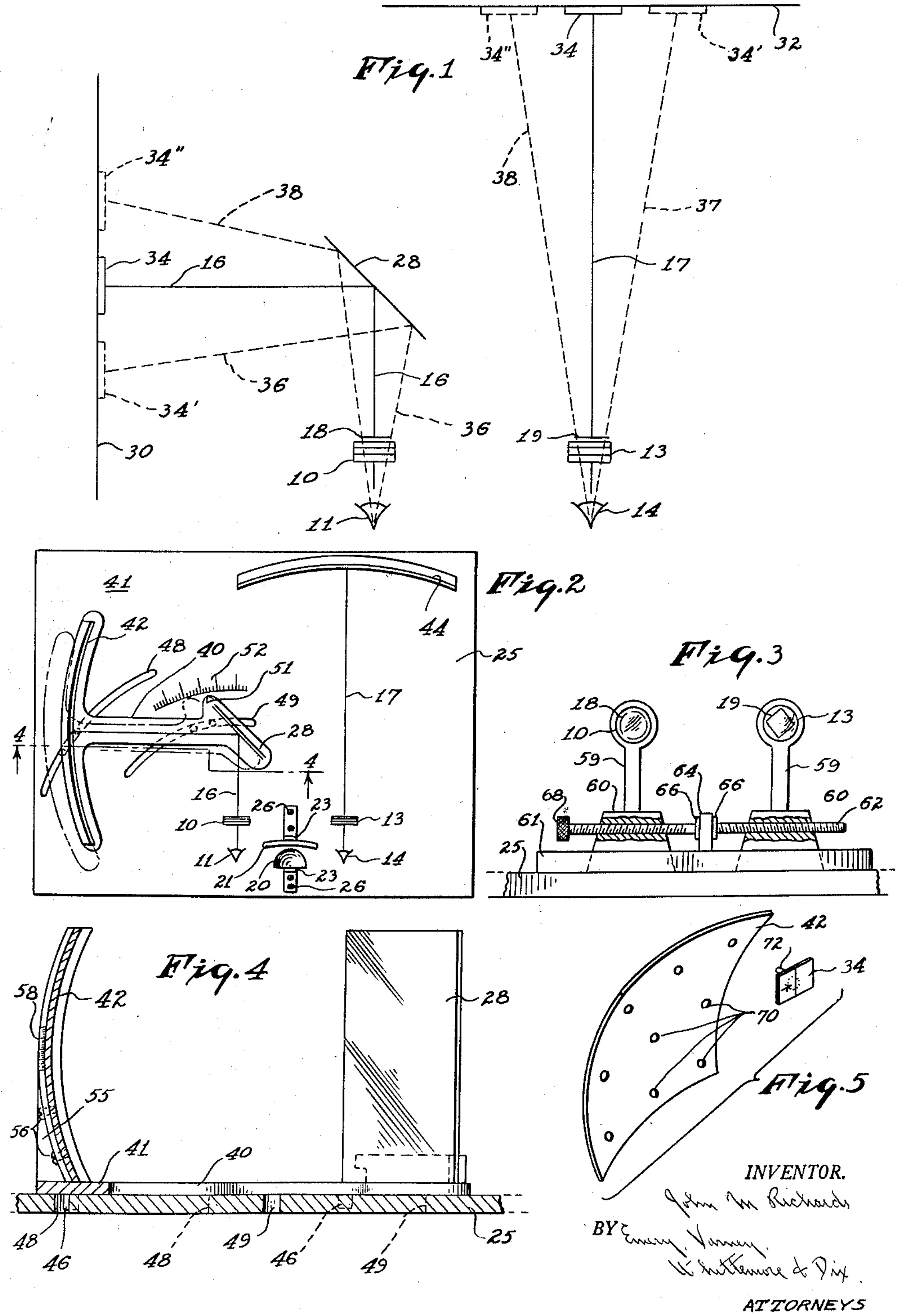
INVENTOR.
John M. Richards
BY Emery, Varney, Whittemore & Dix
ATTORNEYS APPARATUS FOR TESTING EYES
Filed April 28, 1953 3 Sheets-Sheet 2
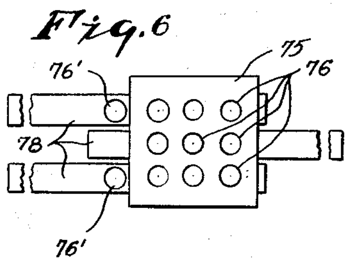
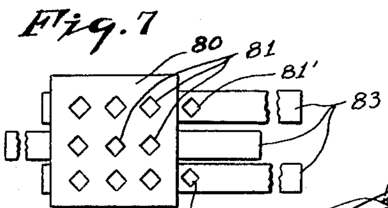
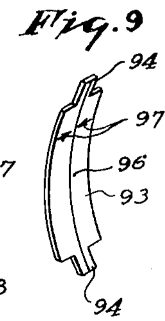
Fig. 8
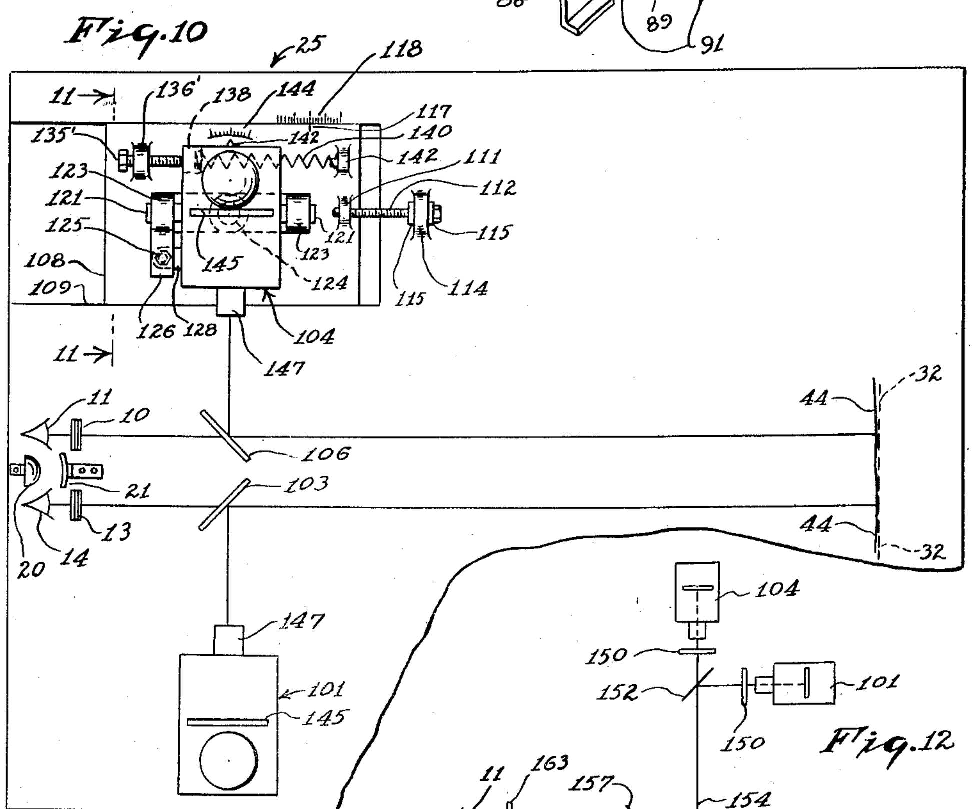
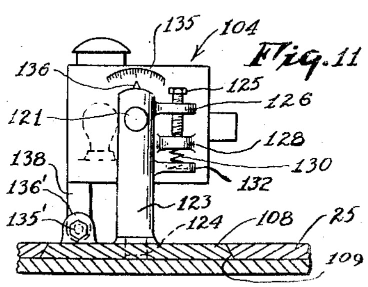
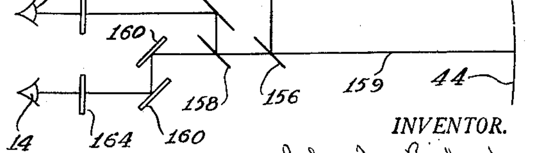
INVENTOR.
John M. Richards
BY Emery, Varney, Whittemore & Dix
ATTORNEYS Jan. 13, 1959 J. M. RICHARDS 2,868,068
APPARATUS FOR TESTING EYES
Filed April 28, 1953 3 Sheets-Sheet 3
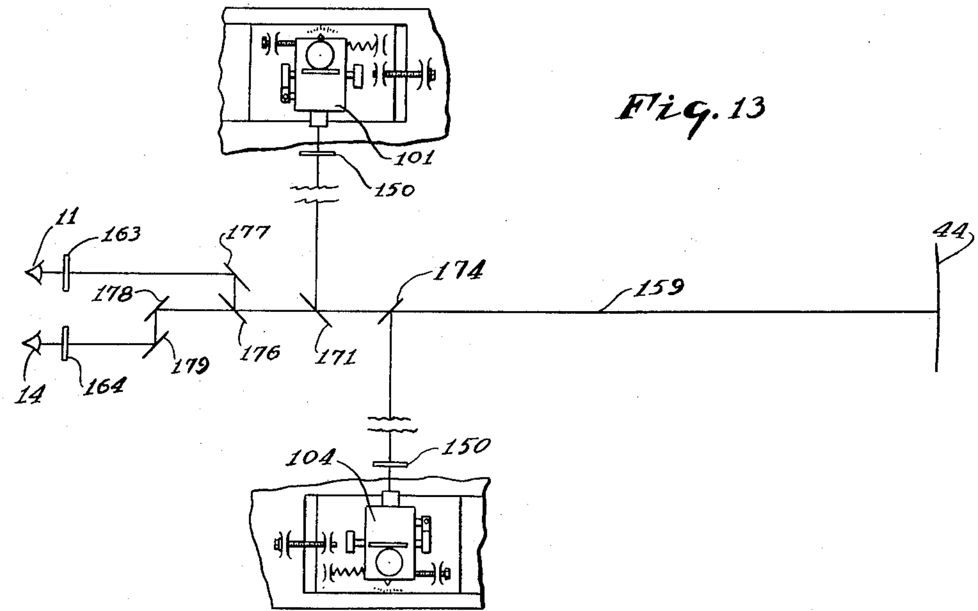
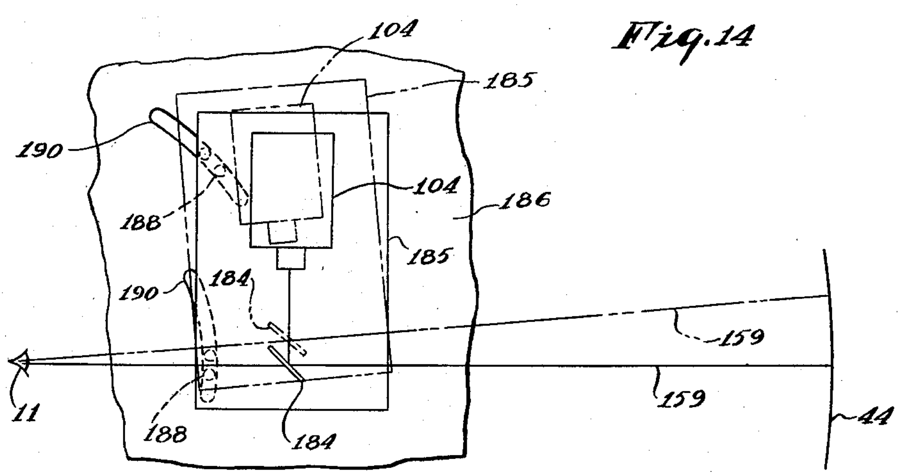
INVENTOR.
John M. Richards
BY Emery, Varney, Whittemore & Dix.
ATTORNEYS United States Patent Office 2,868,068

Patented Jan. 13, 1959

2,868,068

APPARATUS FOR TESTING EYES

John M. Richards, Santa Barbara, Calif.

Application April 28, 1953, Serial No. 351,606

2 Claims. (Cl. 88—20)

This invention relates to apparatus and methods for testing eyes. The invention is primarily concerned with obtaining clinical data on vision through the peripheral portions of test lenses or spectacle lenses as well as vision along the optical axes of the lense. In addition muscle imbalance unrelated to lenses may be tested, with an objective of providing data for its correction by lenses or exercises or surgery.

In conventional equipment for testing the eyes, target devices are often provided with means for swinging them angularly about both vertical and horizontal axes. The better testing equipment has the supports for the target devices constructed in such a way that the devices swing about centers substantially coincident with the centers of rotation of the patient's eyes. This enables the examiner to shift the target devices so as to obtain data on the patient's vision in the nine cardinal positions of gaze, but the test lenses shift with the target devices so that for all positions of gaze, the patient is looking along the optical axes of the test lenses.

Apparatus for testing the eyes with target devices that shift into different angular positions, without shifting the test lenses, is disclosed and claimed in my Patent No. 2,635,502, issued April 21, 1953. It is an object of this invention to provide simple apparatus by which most of the results of the test apparatus disclosed in that application can be obtained. This application is also directed to testing methods which can be used with the apparatus of my Patent No. 2,635,502, as well as with the simple apparatus disclosed herein.

In order to simulate common spectacle positions of use "static lens cells" are needed either for the essentially infinite position of gaze with the primary visual axes parallel, or for the reading position with the optical axes down 20 degrees and converging at 40 cm. from the patient upon a plane perpendicularly bisecting the line connecting the centers of rotation of the two eyes. Static lens cells, or the patient's own spectacle lenses held static, separate from the movement of the instrument target barrels, provide a most important concept.

Consider that a patient may have in his spherical glass correction a plus lens in front of the right eye and a minus lens in front of the left. Then if these lenses be centered in front of his eyes, there is no prismatic deviation caused by them for any object viewed through their optical centers. If, however, this patient should turn his eyes to the right for a given angle toward an object an infinite distance away, this object by its projected images to the two eyes noted will cause his eyes to have to diverge to see the images along the visual axes (primary) directly, whereas looking to the left an equal angle from the binoculus his eyes must then converge equally oppositely. This creates a much different condition of the tonic muscle effect than keeping the optical centers of these lenses in line with the direction of gaze of each eye. Consider the even more varied picture with different cylinder strength and axes and their effect in different directions of gaze creating a different effect for each different gaze position.

Whereas eikonic lenses are designed for their eyes-front effect on the retinal image pattern provided by the secondary visual axes as well as the primary axes in relation to these secondary ones in any given static image pattern (and considered especially with the primary visual axes directed through the optical centers of the eikonic lenses) it is not "aniseikonia," as the term is now commonly used, which this invention is testing for with the static lens cells, but rather true dynamic "tonic" muscle imbalance, or anistonia, which is a function of the angular deviation of the direction of gaze along the primary visual axes of the two eyes from each other—not the function of static secondary visual axes perception which forms the basis for the Horopter concept on which all aniseikonia theory and practice have been based.

These measurements may show either symmetrical or asymmetrical muscle imbalance, or both, and can be used in the correction of such defects. If such defects be induced by the patient's spectacle correction, it is most important to measure the effect as evidenced in his eye reaction. Such an effect may occur without glasses, or the glasses may be the sole cause, or these two may be additive. The measurement of such defects within about 0.1 prism diopter accuracy is needed clinically and gross manipulations obscure necessary clinical results.

In accordance with one feature of this invention, the eye-testing apparatus is made with one fixed target display device, and with a second target display device supported for movement, independently of the test lenses, for obtaining different angular relation of the lines of vision of the two eyes. Another feature of the preferred construction relates to the providing of the desired space between the targets and the eyes without requiring lenses to produce the effect of greater distance than is actually available in the test apparatus. The preferred construction uses a mirror for the movable display device so that that target can be located off to one side, although by use of oppositely polarized light or light of complementary colors as target devices the same screen tangent or "spherical," could be used by each eye, allowance being made for the interpupilary distance in any calculation of muscular imbalance found by testing. Such targets are then preferably projected onto the screens, using projectors providing optical axes coincident to the respective eye viewing the target.

In its simplest embodiment, the apparatus can be made with the mirror angularly movable, but greater accuracy is obtained by having the target support, which is associated with the mirror, movable angularly as a unit with the mirror. Other features of the construction relate to the support of the mirror and target, and to a spherical frame section on which targets can be mounted for viewing at the different positions of gaze.

Other features, objects and advantages of the invention will appear or be pointed out as the description proceeds.

In the drawing, forming a part hereof, in which like reference characters indicate corresponding parts in all the views:

Figure 1 is a diagram of the testing apparatus of this invention showing the way in which the target can be moved so as to cause the patient to view the target through peripheral portions of the test lenses;

Figure 2 is a diagrammatic top plan view of the testing apparatus of this invention;

Figure 3 is a front view, partly in section, showing the lens supports and the means for adjusting them for the interpupilary distance of different patients;

Figure 4 is a front view of the mirror and target support shown in Figure 2;

Figure 5 is a perspective view of a spherical support or screen to which targets are connected in different locations for tests in different positions of gaze;

Figures 6 and 7 are masks with different openings for exposing targets in different positions on the screen of Figure 5;

Figure 8 is a view similar to Figure 5 but showing a modified form of screen;

Figure 9 is a target for use with the screen shown in Figure 8;

Figure 10 is a diagrammatic, top plan view of a modified form of the invention using projected targets;

Figure 11 is an enlarged view taken on the line 11—11 of Figure 10;

Figure 12 is a diagrammatic view showing another modified form of the invention in which projected targets are used with light that is polarized or of complementary colors so that the targets for the right and left eyes can both be shown on the same screen;

Figure 13 is a diagrammatic view showing another modified form of the invention in which both of the projectors are adjustable, and in which both projectors and both eyes utilize a common axis normal to the screen; and Figure 14 is a diagrammatic detail view showing a modified construction for adjusting one of the projectors.

Figure 1 shows a lens support 10 which is located in front of the left eye 11 of a patient whose eyes are being tested. A similar lens support 13 is located in front of the right eye 14 of the patient. Each of these lens supports 10 and 13 preferably has several sockets or cells into which different test lenses are placed with their axes coincident. The optical axis for the lenses in the support 10 is indicated by the reference character 16; and the optical axis of the lenses in the support 13 is indicated by the reference character 17. The lens cells may be removed to allow the patient to wear his own spectacles for the test.

There are masks 18 and 19 carried by the lens holders and these masks limit the field of vision to the predetermined screen area that is to be used for the tests. The masks have incongruent openings so that the patient will not fuse the edges of the masks and thus impair the tests when certain kinds of test targets are used.

In the use of the apparatus, it is necessary to have the patient's eyes in a pre-determined relation to the test lenses. For the purpose of so locating the patient's eyes, the apparatus is equipped with a chin rest 20 (Fig. 2) and a forehead rest 21, each of which has a bracket 23 supporting it from a base 25. The brackets 23 are secured to the base 25 by screws 26, or in any other suitable manner.

Referring again to Fig. 1 there is a mirror 28 behind the lens support 10. This mirror reflects the optical axis 16 toward the left hand side of the apparatus to a tangent screen 30. In the preferred construction, there is no mirror behind the lens support 13, and the patient's right eye looks directly along the optical axis 17 to a tangent screen 32.

Although the preferred construction uses an arcuate screen which is a concave area of a spherical surface, the tangent screens 30 and 32, in Figure 1, are sufficient to illustrate the principle of the invention. For example, if targets 34 are located at the centers of the tangent screens 30 and 32, the patient will view those targets along the axes 16 and 17 of the test lenses. If the targets 34 are shifted into the positions shown in dotted lines and indicated by the reference characters 34', then the patient will view the target along the lines 36 and 37, and his vision will pass through the right-hand portions of the test lenses instead of through the centers of the test lenses. Similarly, if the targets are moved into the positions shown in dotted lines and indicated by the reference characters 34'', the patient views the targets along the lines 38, and his vision is through the left-hand portions of the test lenses in the supports 10 and 13. The targets 34 may also be moved upwardly and downwardly for the other positions of gaze.

Targets with different kinds of markings can be used for testing the eyes with this invention. For example, the targets used may be similar to those shown in my copending patent application Serial No. 766,974, filed August 7, 1947, now Patent No. 2,643,575, or similar to the target shown in my Patent No. 2,603,124. When these targets are used with the present invention, however, they may be made of sufficient size to cover the entire field of vision of a patient looking through the openings in the masks associated with the test lenses. The significant markings on the targets can be located at different positions of gaze and a different target can be used for each position of gaze. With other types of targets similar targets can be used and moved on the screen of the testing apparatus to different positions corresponding to the particular position of gaze for which the next test is to be made.

Masks with effectively multiple apertures providing individually variable simultaneously incongruously masked viewing of the same cardinal field of gaze by opposite eyes may be provided (see Figs. 6 and 7), to confine the view to the respective one of the cardinal positions of gaze (usually nine) being tested. This is of advantage on any screen where smaller targets, as described in the last sentence of the above paragraph, are to be used, and especially if discrete fusion points might otherwise be created by their markings.

Figure 2 shows the mirror 28 supported by, and extending upwardly from, a frame 40. At the other end of the frame 40, there is a support 41 on which an arc screen 42 is supported. This arc screen is curved about the center of rotation of the patient's left eye 11, the radius being measured along the axis 16. A similar arc screen 44 is provided behind the lens support 13.

The frame 40 rests on the base 25 and it has studs 46 extending downwardly into slots 48 and 49 in the top surface of the base 25. These slots are curved and have a common center of curvature which is on a vertical axis through the center of rotation of the patient's left eye 11. An indicator 51, integral with the frame 40, moves along a scale 52, which is on the top face of the base 25. This scale 52 is laid off in angular units about the center of curvature of the slots 48 and 49.

Figure 4 shows the mirror 28 in relation to frame 40 and screen 42, such that when the apparatus is in use, the frame 40 is adjusted to compensate for tonic muscle imbalance in the horizontal meridian. Compensation for tonic muscle imbalance in the vertical meridian is had by moving the target 34 upwardly or downwardly on a support 55, which connects the target to the arc screen 42. The drawing shows screws 56 extending through slots in the support 55 and threading into the back of the arc screen 42 to provide the vertical adjustment. A scale 58 on the support 55 indicates the extent of the adjustment.

Figure 3 shows the lens supports 10 and 13 with downwardly extending stems 59 integrally connected with slide blocks 60 on the base 25. These slide blocks 60 move toward and from one another in a dovetail guideway 61 secured to the base 25. A lead screw 62 threads through the slide block 60, and has opposite threads in the different blocks. An unthreaded center portion of the lead screw 62 extends through a bracket 64, which is fixed to the guideway 61. Thrust collars 66 are connected to the lead screw 62, on opposite sides of the bracket 64, to prevent longitudinal movement of the lead screw 62. Rotation of the lead screw 62, by a knob 68 secured to one end of the screw, moves the slide blocks 60 toward and away from one another along the guideway 61 and across the top surface of the base 25 to change the interpupilary distance of the lens supports 10 and 13.

Figure 5 shows the arc screen 42 with sockets 70 at locations corresponding to the nine cardinal positions of gaze. The target 34 is attached to the arc screen 42 by inserting a stud 72, on the back of the target, into one of the sockets 70 in which the stud is held by friction. Thus the arc screen 42 is a support for holding the target 34 in any selected position of gaze. Another target 34 is similarly supported from, and movable to different sockets in, the arc screen 42. The targets 34 for both eyes are located in corresponding sockets of their arc screens 42 and 41 for each test.

Any adjustments of the arc screen 42 along the scale 58, to compensate for muscle imbalance in the vertical meridian are made after each time that the target 34 is successively placed in the different sockets 70 of the arc screen 42, or into as many of them as necessary to obtain the desired clinical data.

This device may also be used for "visual field testing" as an added associated feature.

When using the screen 42, with small targets 34, it is necessary to prevent the eye from seeing the sockets 70, or the edges of the target, because these sockets and target edges provide discrete fusion points and prevent the eyes from remaining at rest in the meridian being tested. The masks shown in Figures 6 and 7 provide a convenient means for shutting off the view of the sockets 70 in the screen 42, and the edges of the target 34.

Figure 6 shows a mask 75 which, by its angular view obstruction, is large enough to cover the full area of the screen 42. This mask 75 has a plurality of openings 76, one for each of the cardinal positions of gaze. All of the openings 76 are substantially the same size, and preferably the same in shape. In the construction shown, these openings are circular. At the back of the mask 75 there are slides 78. The upper slide 78 extends behind the three upper openings 76. The middle slide 78 extends behind the three middle openings; and the lower slide extends behind the three lower openings 76.

Each of the slides 78 has an opening 76', which can be made to register with any one of the openings 76 by moving the slide 78 lengthwise with respect to the mask 75. When any one of the slides 78 is moved to one limit of its travel, as in the case of the top and bottom slides 78 in Figure 6, the openings 76' are beyond the edge of the mask 75 and the portion of each slide 78 remaining behind the mask 75 closes all of the openings 76 in the particular row served by that slide.

The middle slide 78 is in position to bring its opening in register with the center opening 76. A patient viewing the mask 75, with the slides in the positions shown in Figure 6, would see a target located behind the center opening 76, but would not be conscious of any other openings in the mask, because the slides 78 are the same color as the face of the mask 75 and the front sheet in which the openings 76 are provided is thin and lighted from the front so that the edges of the openings 76 do not cast any shadows on the face of the mask.

Figure 7 shows a mask 80 similar to the mask 75 but having openings 81 which are of a different shape from the openings 76 in the mask 75. There are slides 83 for the mask 80 corresponding to the slides 78 of the mask 75, but made with openings 81' having the same shape as the openings 81. If desired, the openings 81 can be circular but the openings 81' must be of a shape which is different from the openings 76' of the other mask so that a patient cannot use the edges of the openings as discrete fusion points when viewing the targets.

It will be evident that targets in any positions of gaze can be brought into view by manipulating the proper slides 78 and 83 of the masks 75 and 80. The masks 75 and 80 can be used in place of the masks 18 and 19, respectively. The multi-aperture masks may be located any where between the eyes and the screens, but preferably closer to the eyes where a smaller mask subtends a larger angle. The size of the masks must be proportioned to the locations at which they are to be used.

Figure 8 shows a modified construction which makes it necessary to use masks in front of the screens. This figure shows a screen 86 with upper and lower flanges 87 and 88 which are outside of the field of vision of a patient using the apparatus.

The screen 86 has magnets 89 located behind its front face at spaced regions; for example, at the different positions of gaze. These magnets are not visible from the front of the screen, but they serve to hold targets against the curved face of the screen, as will be explained in connection with the description of Figure 9. The upper flange 87 has guide notches 90 at spaced regions along its length. The lower flange 88 has positioning notches 91 immediately under each of the notches 90.

Figure 9 shows a target 93 for use with the screen 86. This target 93 has central tabs 94, of reduced width, at the upper and lower ends of the target. There is a center line 96 extending throughout substantially the full length of the target 93 and there are alignment markings 97 on the face of the target at the desired location for testing a particular poistion of gaze.

When the target 93 is to be used, the tab 94 is inserted in the appropriate positioning notch 91; as for example, in the right-hand notch 91. The lower edges of the target 93, at the end of the tab 94, rest on the top surface of the flange 88 on opposite sides of the positioning notch 91 and accurately positions the target in a vertical direction. The lower tab 94, which fits snugly in the positioning notch 91, and the upper part of the target 93, which fits snugly in the guide notch 90, locate the target accurately in a horizontal direction. The target 93 is made of sheet steel or other magnetic metal so that it is held against the curved face of the screen 86 by the attraction of the magnets 85.

It is to be noted that when target 93 is used in one pair of notches 90 and 91, then the other two remaining pairs are occupied by homogeneous surfaces blending with the background of target 93 to provide no discrete points of fusion.

The alignment markings 97 are for the upper right-hand position of gaze when the target 93 is located in the right-hand notches 90 and 91, as shown in dotted lines in Figure 8. This same target 93 can be used in the middle notches 90 and 91 for the top center position of gaze; and can be used also in the left-hand notches 90 and 91 for the other top position of gaze. The target 93 can be turned upside-down and used for the three bottom positions of gaze.

A separate target is used for the middle poistions of gaze, and other targets having their alignment markings 97 in different relation to one another are substituted for the first targets until one is found where the misalignment of the actual markings on the target compensate for the imbalance of the patient's eyes. This is in accordance with the target testing disclosed in my patent application, Serial No. 766,974, filed Aug. 7, 1947, now Patent No. 2,643,575.

Figure 10 shows a modification of the invention in which the targets on the screens are projected images. In this modified form of the invention, two arc screens 44 are supported from the base 25, and located side by side. If flat screens 32 are used, they are located as indicated in dotted lines. The lens supports, chin rest, and other parts corresponding to those shown in Figure 2 are indicated by the same reference characters as in Figure 2.

The target image for the right-hand screen 44 is obtained from a projector 101 which is at a fixed location on the base 25. This projector 101 throws a light beam against a partially-transmitting, partially-reflecting mirror 103, from which the light is reflected to the right-hand screen 44. The patient's eye 14 sees the screen 44 through the mirror 103. The target image for the left-hand screen 44 is obtained in a similar manner from a projector 104 and a partially-transmitting, partially reflecting mirror 106.

With projected targets, no relative movement can be obtained by shifting the screens 44 transversely of the lines of vision of the eyes. It is necessary, therefore, to move at least one of the projectors with its respective mirror. In the construction shown, the projector 104 is supported with provision for the various movements that are necessary, along with its mirror 106.

A slide 108 is moved along a dovetail guide 109. A lug 111 extends upwardly from the front end of the slide 108. A lead screw 112 threads through the lug 111, and passes through another lug 114 extending up from the base 25. Collars 115, on the lead screw 112, on opposite sides of the lug 114, prevent longitudinal movement of the screw 112 with respect to the lug 114. Rotation of the lead screw 112, therefore, shifts the slide 108 one way or the other along the guide 109.

This movement of the slide 108 along the guide 109 obtains interpupiliary adjustment of the projector 104 with respect to the projector 101 so that the projectors can be adjusted to correspond to the interpupiliary distance of the eyes of a patient who is being tested. An indicator 117, on the slide 108, moves along a scale 118, provided on the base, to show the interpupilary adjustment of the projector 104 with respect to the fixed projector 101.

The projector 104 also has movement about vertical and horizontal axes. The vertical adjustment is obtained by trunnions 121 extending from opposite sides of the projector 104. These trunnions turn in a frame 123 which extends downwardly on both sides of the projector and then under the projector to a stud 124 which fits into a socket in the center of the slide 108.

The projector 104 is located at the same distance as the eye 11 from the left-hand screen 44; and the axis about which the trunnions 121 rock corresponds to a horizontal line through the center of rotation of the eyes 11 and 14. This correspondence is obtained by having the axis of the trunnions at right angles to the projected line of vision and at the same distance from the screen, and at the same elevation above the base as are the eyes 11 and 14.

The projector 104 is adjusted angularly about the axis of the trunnions 121 by a screw 125 which threads through a lug 126 at the front of the frame 123. This screw 125 bears against an extension 128 which is attached to the side wall of the projector 104. The extension 128 is held in contact with the screw 125 by a spring 130, compressed between the extension 128 and a lower lug 132 of the frame 123.

The angular adjustment of the projector 104 about the axis of the trunnions 121 is measured by a scale 135 on the side of the projector. This scale moves past an indicator 136 which is fixed with respect to the frame 123. The scale 135 may be graduated angularly in degrees or prism-diopters, preferably the latter.

The stud 124 turns in the socket in the slide 108 to effect rotation of the target about a vertical axis which corresponds to the vertical axis through the eye 11 of the patient. This correspondence is obtained by having the axis of rotation of the stud 124 at right angles to the projected line of vision of the eye 11 and at the same distance from the left-hand screen.

Movement of the frame 123, and the projector 104, about the axis of the stud 124, is effected by an adjusting screw 135' which threads through a lug 136' extending upwardly from the slide 108. The adjusting screw 135' bears against a lug 138 extending downwardly from the projector 104, and the lug 138 is held against the adjusting screw 136' by a spring 140 (Fig. 10) compressed between the back of the lug 138 of the projector and another lug 142 which extends upwardly from the slide 108.

The rotary movement of the projector 104 about the axis of the stud 124 is measured by an indicator 142 carried by the projector 104. This indicator 142 moves along an angular scale 144 graduated in degrees or prism-diopters, preferably the latter.

The projectors 101 and 104 have slots 145 in their top walls for receiving slides which are projected to make the target images on the screens 44. Lens mounts 147 of the projectors are adjustable to focus the projectors in a well-understood manner.

Figure 12 shows another modified form of the invention in which the projectors 101 and 104 are used to produce variably superimposed or juxtaposed images on a single screen 44 by means of variably positioned projector slide target object positions. Each of the projectors transmits its beam through a light modifier 150 which may contain either a polarizing sheet or a transparent element of a selected color. If polarizing sheets are used, they are oriented so that the beams of light from the respective projectors are polarized with 90° phase difference. If colored, transparent sheets are used, the colors selected for the respective light beams are complementary.

In Figure 12, the projector 101 directs its light beam against a mirror 152 which is a partially-transmitting, partially-reflecting mirror. The projector 104 directs its light beam through the mirror 152 in alignment with the reflected beam 154 of the projector 101.

The coincident light beams from the projectors 101 and 104 are reflected from a mirror 156 to the screen 44.

The patient's eye 11 has a line of sight which is reflected from a mirror 157 to a partially-transmitting, partially-reflecting mirror 158 which direct the line of sight through the mirror 156 which is a partially-transmitting, partially-reflecting mirror. The line of sight to the screen 44 is along a line 159 which is normal to the surface of the screen 44. The line of sight from the patient's eye 14 is reflected by mirrors 160 through the partially-transmitting, partially-reflecting mirror 158 along a line of vision coincident with the line 159.

In order to have the eye 11 see only one of the images on the screen 44, there is a light modifier 163 in front of the eye with a polarizing sheet having its plane of polarization the same as the light modifier 150 in front of the projector intended for the eye 11. Similarly, there is a light modifier 164 in front of the patient's eye 14 with its plane of polarization the same as that of the projector intended for the eye 14. If complementary colors are used, instead of polarized light to distinguish the images on the screen, the light modifiers 163 and 164 are provided with transparent colored sheets corresponding to those in front of the respective projectors 101 and 104.

Fig. 13 shows another modified form of the invention in which the projectors 101 and 104 are each mounted for adjustment in the same manner as the projector 104 of Fig. 10. Light modifiers 150, for polarizing or coloring the light from the projectors, are located in front of the projector lenses. Complementary light modifiers 163 and 164 are located in front of the eyes 11 and 14, respectively.

The projector 101 directs its light beam against a partially-transmitting, partially-reflecting mirror 171, and the projector 104 directs its light beam against a similar mirror 174. The reflected beam from the mirror 171 passes through the mirror 174 and along the axis 159 to the screen 44. The light beam reflected from the mirror 174 passes along the same axis 159 to the screen 44.

The light, from the screen 44, seen by the eye 11 passes through the partially-transmitting, partially-reflecting mirrors 171 and 174, and is reflected by another partially-reflecting, partially-transmitting mirror 176 to a mirror 177 located in front of the eye. The light transmitted through the mirror 176 is reflected by two other mirrors 178 and 179 to the eye 14. The intensity of illumination from the projectors 101 and 104 is regulated to compensate for the different reductions in light which result from the fact that some of the light beams have to pass through more partially-reflecting, partially-transmitting mirrors than do some of the other light beams. The adjustment is made so that each of the eyes sees an image with substantially the same illumination as that seen by the other eye.

In Fig. 13, the projectors 101 and 104, and their respective mirrors 171, 176 and 177; and 174, 178 and 179, to align the respective eyes also, are respectively angularly movable about a center which is in effect a projected center of the eye (or binoculus if both eyes coincide) for which each projector supplied the image. This is similar to the adjustment already described in detail in connection with Fig. 10.

Fig. 14 shows a more detailed construction for adjusting the projector to change the position of the images on the screen. In this construction the mirror as well as the projector are adjusted. Because of the simultaneous movement of both the mirror and the projector, it is necessary that they move about an axis through the actual center of rotation of the patient's eye. This result is achieved by having the projector 104 and its mirror 184 supported on a common carriage 185 which rests upon and is movable on a supporting base 186. The carriage 185 has studs 188 extending downwardly into slots 190 in the supporting base 186.

These slots 188 are curved with their center of curvature on a vertical axis which passes through the axis of rotation of the patient's eye 11. The eye is located in a definite position by means of a head rest as previously explained. The mirror 184 is a half-reflecting, half-transmitting mirror, so that the eye 11 can view the screen 44 through the mirror 184 and along the axis 159 which is co-incident with the axis of the reflected beam from the projector 104. The dotted line position of the axis 159 corresponds with the dotted line positions of the projector 104 and mirror 184.

If desired, the top of the carriage 185 can be adjustable with respect to the portion of the carriage beneath it, with studs moving along slots which have their centers of curvature on a horizontal axis through the center of rotation of the patient's eye which views the target imaged by that projector. This makes possible vertical adjustment corresponding to the horizontal adjustment represented by the full and dotted line positions of the axis 159. Although Fig. 14 is a plan view when considered as a modification of the structure shown in the preceding figures, it will be understood that the same structure can be oriented so as to make Fig. 14 an elevation with the projector 104 directing its light beam downward, initially, for horizontal reflection from the mirror 184 to the screen 44.

The preferred embodiments of the invention have been illustrated and described, but changes and modifications can be made, and some features of the invention can be used in different combinations without departing from the invention as defined in the claims.

What is claimed is:

1. Equipment for testing eyes in different positions of gaze, said equipment including a first and a second lens holder for supporting test lenses in position in front of a patient's left and right eye, respectively, a first and a second display device located behind the first and second lens holders, respectively and in position to be viewed by the patient through lenses in said holders, each display device having a width greater than the interpupilary spacing of the lens holders, a common support on which the lens holders and the display devices are mounted, the lens holders being in relatively fixed positions on said common support, said support including means that holds the first display device in a direct line with the optical axis of test lenses in the first lens holder, the second display device having a reflector which projects the line of vision through lens in the second lens holder, at an angle and to a target means out of line with the optical axis of a lens in said second lens holder, the reflector being at a location forward of the first display device and said reflector also being located in a position where the reflected image of the second display device is out of the field viewed by an eye at the first lens holder, bearing means on which the second display device is movable to change the line of vision to that display device with respect to the line of vision to the first display device, the relatively fixed lens holders being adjustable transversely of their optical axes for the interpupilary distance between successive operations of the equipment and each of the display devices includes a screen located beyond the lens holder by the actual distance for which a test is to be made, the screen of the first display device being relatively fixed on the support and the screen of the second display device, together with the reflector being on said bearing means for horizontal movement into different angular positions, and the space between the lens holders and the screens being uncovered so that the screens can be watched and manipulated by an examiner while the patient views them through lenses in the lens holders, and there are target means adjustably and movably mounted on the screens, and means on the screens for shifting the target means into different positions of gaze that require the patient to view the target means through different peripheral areas of the test lenses in the holders.

2. Equipment for testing eyes in different positions of gaze, said equipment including a first and a second lens holder for supporting test lenses in position in front of a patient's left and right eye, respectively, a first and a second display device located behind the first and second lens holders, respectively and in position to be viewed by the patient through lenses in said holders, each display device having a width greater than the interpupilary spacing of the lens holders, a common support on which the lens holders and the display devices are mounted, the lens holders being in relatively fixed positions on said common support, said support including means that holds the first display device in a direct line with the optical axis of test lenses in the first lens holder, the second display device having a reflector which projects the line of vision through lens in the second lens holder, at an angle and to a target means out of line with the optical axis of a lens in said second lens holder, the reflector being at a location forward of the first display device and said reflector also being located in a position where the reflected image of the second display device is out of the field viewed by an eye at the first lens holder, bearing means on which the second display device is movable to change the line of vision to that display device with respect to the line of vision to the first display device, the test lenses being held at predetermined locations with respect to the base, a head rest mounted on the base in position to locate a patient's head with his eyes in predetermined positions in front of the lens cells, and each of the display devices including an arc screen comprising a section of a sphere subtended by vertical and transverse angles of 40° and 40° respectively, with the projected center of each sphere substantially at the center of rotation of the eye looking through the lens holder and toward that screen, and target means movable independently of the lens holders and into different positions of gaze, so that the patient's line of vision to the target means passes through different peripheral sections of the test lenses in the cells of the lens holders.

References Cited in the file of this patent

UNITED STATES PATENTS

| | | |
|---|---|---|
| 1,417,283 | Sloan | May 23, 1922 |
| 1,669,916 | Smith | May 15, 1928 |
| 1,942,850 | Tillyer | Jan. 9, 1934 |
| 1,946,925 | Ames | Feb. 13, 1934 |
| 2,063,015 | Ames | Dec. 8, 1936 |
| 2,095,235 | Ames | Oct. 12, 1937 |
| 2,104,552 | Blee et al. | Jan. 4, 1938 |
| 2,118,173 | Dittmer | May 24, 1938 |
| 2,126,713 | Ames et al. | Aug. 16, 1938 |
| 2,152,050 | Henning et al. | Mar. 28, 1939 |
| 2,238,207 | Ames et al. | Apr. 15, 1941 |
| 2,262,217 | Wottring | Nov. 11, 1941 |
| 2,376,554 | Ranoe | May 22, 1945 |
| 2,635,502 | Richards | Apr. 21, 1953 |